F. E. SMALL.
PISTON PACKING.
APPLICATION FILED SEPT. 13, 1920.
1,426,783.
Patented Aug. 22, 1922.
Fig. 1.
Fig. 2.
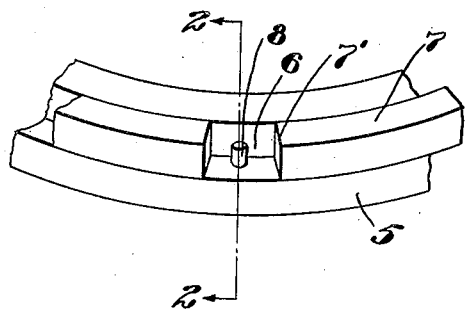
Fig. 3.
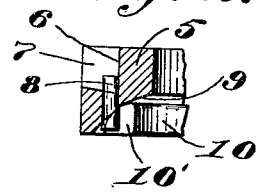
Inventor
Frederick E. Small
by Roberts Roberts & Cushman
Attorneys.

UNITED STATES PATENT OFFICE.

FREDERICK E. SMALL, OF NEEDHAM, MASSACHUSETTS, ASSIGNOR TO PRESSURE PROOF PISTON RING COMPANY, OF BOSTON, MASSACHUSETTS, A CORPORATION OF MASSACHUSETTS.

PISTON PACKING.

1,426,783.

Specification of Letters Patent. Patented Aug. 22, 1922.

Application filed September 13, 1920. Serial No. 410,052.

*To all whom it may concern:*

Be it known that I, FREDERICK E. SMALL, a citizen of the United States, and resident of Needham, in the county of Norfolk and State of Massachusetts, have invented new and useful Improvements in Piston Packing, of which the following is a specification.

This invention relates to an improved packing ring and more particularly to a packing ring adapted for use in pistons of internal combustion engines to afford a tight joint between the piston and the cylinder. This invention is in the nature of an improvement on the invention described and claimed in my prior patents No. 1,129,910, granted March 2, 1915, and No. 1,173,319, granted February 29, 1916.

The improved packing disclosed in my aforesaid patents comprises a main bearing ring and an outer breaker ring, the two together being adapted to fit in the packing groove in the piston to close the clearance space between the piston and the inner cylinder walls. The main bearing ring is formed with its upper outer corner cut away to form a circumferential seat and the breaker ring is adapted to fit in and completely fill this seat. Both rings are preferably formed of the usual type of cast iron or similar metal and are split at one point and adapted to be sprung into place. The lower corner of the inner periphery of the main bearing ring is beveled to allow the insertion of an expander ring behind the ring and in the packing groove. The expander ring is formed of resilient metal and is arranged to press outward against the beveled surface of the main bearing ring so as to force the bearing and breaker rings together against the cylinder, and due to the angle of the bevel also to force them longitudinally against one wall of the groove, the expander ring bearing against the opposite wall of the groove.

With composite rings of this type it is essential that means be provided to retain the main bearing ring and breaker rings in predetermined relation so that the rings will not creep to the position where their respective splits coincide. It is also highly desirable to provide means to prevent creeping of the expander ring. This is for the reason that its effect in forcing outward the bearing rings varies materially depending upon the relation of the split in the expander ring to the split in the bearing rings. In my prior patents to which I have referred I have shown a horizontal pin adapted to maintain the bearing and breaker rings in predetermined relation. While effective in its purpose this pin is preferably formed of steel and when the cast iron bearing rings wear down or if the pin works loose in its seat, there is a possibility of scoring the cylinder walls. In my present invention I have provided a vertically fitted pin which is not subject to these objections. It is so located that there is no possibility of scoring the cylinder walls either through wear of the rings or through the pin working loose in its seat.

It is an object of the present invention to provide, in connection with composite piston rings of the the character described, means particularly adapted to retain their component parts in predetermined relation, the means being of a character adapted to be efficient in operation and without danger to the working parts upon wear or looseness. It is a further object to provide means of this character whereby a single pin is adapted to retain both a breaker ring and expander ring in predetermined relation to a main or bearing ring. Other and further objects will appear as the description proceeds.

I have illustrated certain embodiments of my invention in the accompanying drawing, in which,—

Figure 1 is a fragmentary perspective view showing a portion of a three-part ring;

Figure 2 is a section taken on line 2—2 of Fig. 1; and

Figure 3 is a section of a two-part ring supplied with my invention.

In the embodiment shown in Figs. 1 and 2 the main or bearing ring has been designated at 5, and is provided with the circumferential seat 6 in which is seated the breaker ring 7, the breaker ring being split at 7'. A positioning pin 8 is inserted vertically through the seat 6 and extends through the lower beveled portion 9 of the main ring. As shown in Fig. 2 the spring expander ring 10 is interfitted with the beveled portion of the main ring and is split at 10' adjacent the pin 8. In Fig. 3 I have shown a two piece ring comprising a bearing ring 12 beveled at 13 and having the positioning pin 14 extending through from its upper surface to the beveled portion 13. The expander ring 15 is seated against the beveled portion 13, the pin 14 extending down into the split in the expander ring. The follower or expander rings 10 and 15 are normally of greater diameter than the bearing rings 5, 7 and 12 and the latter are urged outwardly into contact with the cylinder walls and axially against the piston groove by the expansive force of the follower rings. With the form of pin shown in the figures there is no danger of the pin working outwardly in its seat sufficiently to contact with the cylinder walls for the reason that the pins are located parallel to the axis of the cylinder and if they work loose in their seat they will merely contact with the sides of the piston grooves. In the form shown in Figs. 1 and 2 the single pin serves the double purpose of maintaining both expander and breaker rings in fixed relation to the main bearing ring. This provides a very simple and inexpensive, as well as effective construction.

I claim:

1. In a piston packing comprising a main bearing ring, a split breaker ring and a split expander ring arranged upon opposite sides of said main ring, and axially directed stop means projecting from the main bearing ring into the splits of the breaker and expander rings respectively and adapted thereby to preserve the relative circumferential position of the rings.

2. In a piston packing comprising a main bearing ring having a beveled inner portion and an outer circumferential seat, a split breaker ring fitted in the seat upon the main ring and a split expander ring bearing against said beveled portion, a pin extending axially through the main bearing ring and projecting into the circumferential seat and from the service of the inner beveled portion and fitting into the splits of the breaker and expander rings and adapted thereby to preserve the relative circumferential position of the rings.

Signed by me at Boston, Massachusetts, this ninth day of September, 1920.

FREDERICK E. SMALL.